US005212358A

United States Patent [19]

Yoshimura et al.

[11] Patent Number: 5,212,358

[45] Date of Patent: May 18, 1993

[54] ACCELERATION SENSOR

[75] Inventors: Kazuo Yoshimura; Shigeru Shimozono; Ryo Satoh, all of Kanagawa, Japan

[73] Assignee: Takata Corporation, Tokyo, Japan

[21] Appl. No.: 734,739

[22] Filed: Jul. 23, 1991

[30] Foreign Application Priority Data

Aug. 23, 1990 [JP] Japan .................................. 2-221995

[51] Int. Cl.[5] .............................................. G01P 15/135

[52] U.S. Cl. .......................... 200/61.45 M; 200/61.53; 73/514

[58] Field of Search ............................. 73/514, 517 R; 200/61.45 M, 61.53

[56] References Cited

U.S. PATENT DOCUMENTS 3,100,292 8/1963 Warner et al. .................... 73/517 R
4,827,091 5/1989 Behr ........................... 200/61.45 M
4,873,401 10/1989 Ireland ........................ 200/61.45 M
4,933,515 6/1990 Behr et al. ................... 200/61.45 M
4,959,513 9/1990 Maniar ....................... 200/61.45 M

FOREIGN PATENT DOCUMENTS 56-055541 5/1981 Japan .
454269 1/1975 U.S.S.R. .

*Primary Examiner*—John E. Chapman
*Attorney, Agent, or Firm*—Kanesaka and Takeuchi

[57] ABSTRACT

An accelerator sensor comprising a cylinder of a conductive material, a magnetized inertial member mounted in the cylinder so as to be movable longitudinally of the cylinder, a conductive member mounted at least on the end surface of the inertial member that is on the side of one longitudinal end of the cylinder, a pair of electrodes disposed at this one longitudinal end of the cylinder, and an attracting member disposed near the other longitudinal end of the cylinder. When the conductive member of the inertial member comes into contact with the electrodes, these electrodes are caused to conduct via the conductive member. The attracting member is made of a magnetic material such that the attracting member and the inertial member are magnetically attracted toward each other. The cylinder is made of a copper alloy having a resistance temperature coefficient less than $3\times10^{-3}$.

3 Claims, 1 Drawing Sheet

ACCELERATION SENSOR

FIELD OF THE INVENTION

The present invention relates to an acceleration sensor and, more particularly, to an acceleration sensor adapted to detect a large change in the speed of a vehicle caused by a collision or the like.

BACKGROUND OF THE INVENTION

An acceleration sensor of this kind is described in U.S. Pat. No. 4,827,091. This known sensor comprises a cylinder made of a conductive material, a magnetized inertial member mounted in the cylinder so as to be movable longitudinally of the cylinder, a conductive member mounted at least on the end surface of the inertial member which is on the side of one longitudinal end of the cylinder, a pair of electrodes disposed at one longitudinal end of the cylinder, and an attracting member disposed near the other longitudinal end of the cylinder. When the conductive member of the magnetized inertial member makes contact with the electrodes, these electrodes are caused to conduct via the conductive member. The attracting member is made of such a magnetic material that the attracting member and the inertial member are magnetically attracted towards each other.

In this acceleration sensor, the magnetized inertial member and the attracting member attract each other. When no or almost no acceleration is applied to the sensor, the inertial member is at rest at the other end in the cylinder.

If a relatively large acceleration acts on this acceleration sensor, the magnetized inertial member moves against the attracting force of the attracting member. During the movement of the inertial member, an electrical current is induced in this cylinder to produce a magnetic force which biases the inertial member in the direction opposite to the direction of movement of the inertial member. Therefore, the magnetized inertial member is braked, so that the speed of the movement is reduced.

When the acceleration is less than a predetermined magnitude, or threshold value, the magnetized inertial member comes to a stop before it reaches the front end of the cylinder. Then, the inertial member is pulled back by the attracting force of the attracting member.

When the acceleration is greater than the predetermined magnitude, or the threshold value, e.g., the vehicle carrying this acceleration sensor collides with an object, the inertial member arrives at one end of the cylinder. At this time, the conductive layer on the front end surface of the inertial member makes contact with both electrodes to electrically connect them with each other. If a voltage has been previously applied between the electrodes, an electrical current flows when a short circuit occurs between them. This electrical current permits detection of collision of the vehicle.

Heretofore, the cylinder has been made of oxygen-free copper which has a small electric resistance. After making various investigations, the present inventor and others have found the following facts. The resistance temperature coefficient of the electric resistance of oxygen-free copper has a relatively large value of about $4\times10^{-3}$°C.$^{-1}$. Therefore, if the temperature of the surroundings of the acceleration sensor using the cylinder made of oxygen-free copper rises, then the electric resistance of the cylinder increases considerably. This reduces the electrical current induced by the movement of the magnetized inertial member. As a result, the magnetic braking force applied to the inertial member becomes less than intended.

Conversely, if the ambient temperature drops, the electric resistance of the cylinder decreases considerably. The result is that the magnetic braking force produced by the electrical current induced by the movement of the inertial member becomes greater than intended.

Where the braking force or damping force applied to the magnetized inertial member varies greatly, the acceleration sensor detects accelerations with great errors.

SUMMARY OF THE INVENTION

It is an object of the present invention to provide an acceleration sensor which has a cylinder made of a conductive material and incorporating a magnetized inertial member and in which the acceleration threshold value used in making a decision to determine whether the vehicle collided is affected little by temperature variations.

It is another object of the invention to provide an acceleration sensor capable of always precisely detecting a collision of the vehicle even if temperature varies greatly.

The novel acceleration sensor comprises: a cylinder made of a conductive material; a magnetized inertial member mounted in the cylinder so as to be movable longitudinally of the cylinder; a conductive member mounted on the end surface of the inertial member which is on the side of one longitudinal end of the cylinder; a pair of electrodes which is disposed at this one longitudinal end of the cylinder and which, when the conductive member of the inertial member makes contact with the electrodes, is caused to conduct via the conductive member; and an attracting member disposed near the other longitudinal end of the cylinder and made of a magnetic material which is magnetically attracted toward the inertial member. The cylinder is made of a metal having a resistance temperature coefficient less than $3\times10^{-3}$°C.$^{-1}$.

In this novel acceleration sensor, the resistance temperature coefficient of the cylinder is small and so if the temperature of the surroundings of the sensor varies, the braking force or damping force applied to the magnetized inertial member during movement of the inertial body changes only a little.

BRIEF DESCRIPTION OF THE DRAWING

The FIGURE is a cross-sectional view of an acceleration sensor according to the invention.

DETAILED DESCRIPTION OF THE INVENTION

Figure 1:
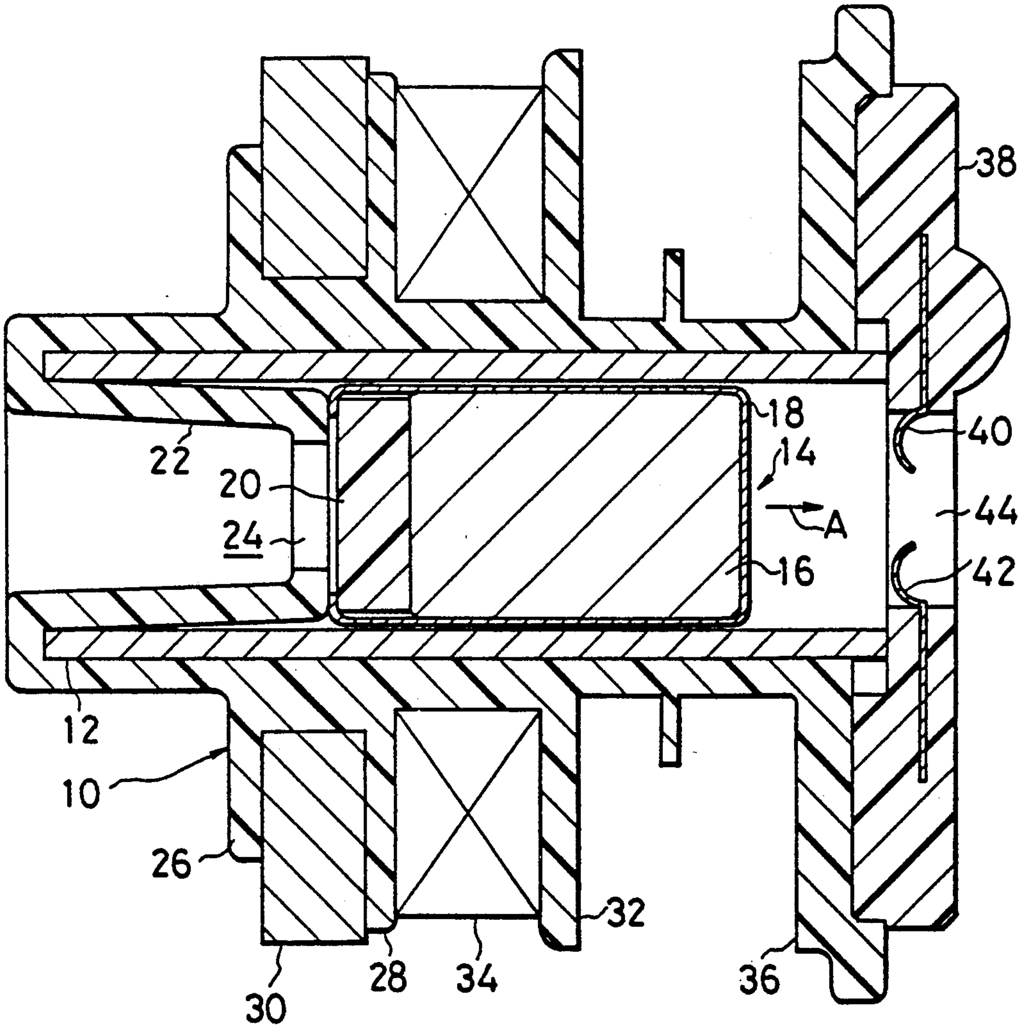

Referring to the FIGURE, there is shown an acceleration sensor according to the invention. This sensor has a cylindrical bobbin 10 made of a nonmagnetic material such as a synthetic resin. A cylinder 12 made of a copper alloy is held inside the bobbin 10. A magnetized inertial member or magnet assembly 14 is mounted in the cylinder 12. This assembly 14 comprises a core 16 made of a cylindrical permanent magnet, a cylindrical case 18 having a bottom at one end, and a packing 20 made of a synthetic resin. The case 18 is made of a nonmagnetic conductive material such as copper and encloses the core 16. The case 18 is opened at the other end thereof. The packing 20 acts to hold the core 16 within the case 18. The magnet assembly 14 is fitted in the cylinder 12 in such a way that it can move longitudinally of the cylinder 12.

The bobbin 10 has an insert portion 22 at its one end. This insert portion 22 enters the cylinder 12. An opening 24 is formed at the front end of the insert portion 22. A pair of flanges 26 and 28 protrudes laterally near the front end of the insert portion 22 of the bobbin 10. An annular attracting member or return washer 30 which is made of a magnetic material such as iron is held between the flanges 26 and 28.

The bobbin 10 has another flange 32. A coil 34 is wound between the flanges 28 and 32. A further flange 36 is formed at the other end of the bobbin 10. A contact holder 38 is mounted to this flange 36.

This contact holder 38 is made of a synthetic resin. A pair of electrodes 40 and 42 is buried in the holder 38. An opening 44 is formed in the center of the holder 38. The front ends of the electrodes 40 and 42 protrude into the opening 44. The electrodes 40 and 42 have arc-shaped front end portions. Parts of the arc-shaped front end portions are substantially flush with the front end surface of the cylinder 12.

Lead wires (not shown) are connected with the rear ends of the electrodes 40 and 42 to permit application of a voltage between them.

The operation of the acceleration sensor constructed as described thus far is now described. When no external force is applied, the magnet assembly 14 and the return washer 30 attract each other. Under this condition, the rear end of the magnet assembly 14 is in its rearmost position where it bears against the front end surface of the insert portion 22. If an external force acts in the direction indicated by the arrow A, then the magnet assembly 14 moves in the direction indicated by the arrow A against the attracting force of the return washer 30. This movement induces an electrical current in the cylinder 12 made of a copper alloy, thus producing a magnetic field. This magnetic field applies a magnetic force to the magnet assembly 14 in the direction opposite to the direction of movement. As a result, the assembly 14 is braked.

Where the external force applied to the acceleration sensor is small, the magnet assembly 14 comes to a stop on its way to one end of the cylinder 12. The magnet assembly 14 will soon be returned to its rearmost position shown in FIG. 1 by the attracting force acting between the return washer 30 and the magnet assembly 14.

If a large external force is applied in the direction indicated by the arrow A when the vehicle collides, then the magnet assembly 14 is advanced up to the front end of the cylinder 12 and comes into contact with the electrodes 40 and 42. At this time, the case 18 of the magnet assembly 14 which is made of a conductive material creates a short-circuit between the electrodes 40 and 42, to produce an electrical current between them. This permits detection of an acceleration change greater than the intended threshold value. Consequently, the collision of the vehicle is detected.

The aforementioned coil 34 is used to check the operation of the acceleration sensor. In particular, when the coil 34 is electrically energized, it produces a magnetic field which biases the magnet assembly 14 in the direction indicated by the arrow A. The magnet assembly 14 then advances up to the front end of the cylinder 12, short-circuiting the electrodes 40 and 42. In this way, the coil 34 is energized to urge the magnet assembly 14 to move. Thus, it is possible to make a check to see if the magnet assembly 14 can move back and forth without trouble and if the electrodes 40 and 42 can be short-circuited.

In the present example, the resistance temperature coefficient of the cylinder 12 made of the copper alloy is $2\times10^{-3}$°C.$^{-1}$. Since the resistance temperature coefficient is small in this way, if the temperature of the surroundings of the acceleration sensor varies from a low temperature, e.g., −40° C., to a high temperature, e.g., 80° C., the variations of the electrical current induced in the cylinder 12 during movement of the magnet assembly 14 are quite small. Hence, the braking force applied to the magnet assembly 14 varies only a little. As a result, the threshold value used as a reference to the acceleration detected by the acceleration sensor changes little.

We performed various experiments and have found that setting the resistance temperature coefficient of the cylinder 12 less than $2\times10^{-3}$°C.$^{-1}$ yields especially desirable results. Specifically, where the cylinder is made of a material having a resistance temperature coefficient less than $2\times10^{-3}$°C.$^{-1}$, the variations of the threshold value caused by temperature variations are quite small. This resistance temperature coefficient can be negative, since it can follow changes in the magnetic force of the magnetized inertial member caused by temperature variations.

One example of the copper alloy having such a low resistance coefficient consists of 0.2–1% by weight of Ni, 0.05–0.5% by weight of Si, 0.05–0.5% by weight of Zn, and the remaining percentage of Cu.

One example of the most preferred copper alloy consists of 0.6% by weight of Ni, 0.11% by weight of Si, 0.2% by weight of Zn, and the remaining percentage of Cu.

What is claimed is:

1. An acceleration sensor comprising:

a cylinder made of a metal having a resistance temperature coefficient less than $3\times10^{-3}$°C.$^{-1}$, said metal being a copper alloy consisting essentially of 0.2–1% by weight of Ni, 0.05–0.5% by weight of Si, 0.05–0.5% by weight of Zn, and a remaining percentage of Cu;

a magnetized inertial member mounted in the cylinder so as to be movable longitudinally of the cylinder;

a conductive member mounted at least on one end surface of the inertial member which is on a side of one longitudinal end of the cylinder;

a pair of electrodes which is disposed at said one longitudinal end of the cylinder and which, when the conductive member of the inertial member makes contact with the electrodes, is caused to conduct via the conductive member; and an attracting member disposed near the other longitudinal end of the cylinder and made of a magnetic material, the inertial member being magnetically attracted by the attracting member.

2. The acceleration sensor of claim 1, wherein the resistance temperature coefficient of said metal is less than $2\times10^{-3}$.

3. The acceleration sensor of claim 1, wherein said metal is a copper alloy consisting of approximately 0.6% by weight of Ni, approximately 0.11% by weight of Si, approximately 0.2% by weight of Zn, and the remaining percentage of Cu.

* * * * *